(12) United States Patent
Paik

(10) Patent No.: US 7,840,132 B2
(45) Date of Patent: Nov. 23, 2010

(54) DISPLAY DEVICE FOR STORING VARIOUS SETS OF CONFIGURATION DATA AND METHOD FOR CONTROLLING THE SAME

(75) Inventor: Seung Woo Paik, Daegu (KR)

(73) Assignee: LG Electronics Inc., Seoul (KR)

( * ) Notice: Subject to any disclaimer, the term of this patent is extended or adjusted under 35 U.S.C. 154(b) by 1127 days.

(21) Appl. No.: 11/368,404

(22) Filed: Mar. 7, 2006

(65) Prior Publication Data
US 2007/0189760 A1   Aug. 16, 2007

(30) Foreign Application Priority Data
Feb. 14, 2006   (KR) .................... 10-2006-0014342

(51) Int. Cl.
*G03B 17/24* (2006.01)
(52) U.S. Cl. .................. 396/310; 348/E5.105
(58) Field of Classification Search ......... 396/310; 386/46, 125, E5.07; 348/E5.103, E5.105, 348/E5.122, E5.137, E9.027
See application file for complete search history.

(56) References Cited

U.S. PATENT DOCUMENTS

| | | | |
|---|---|---|---|
| 6,038,614 A | 3/2000 | Chan et al. ................ 710/1 |
| 6,078,758 A * | 6/2000 | Patton et al. ............. 396/312 |
| 6,507,696 B1 | 1/2003 | Chung et al. ............. 386/125 |
| 6,819,395 B2 * | 11/2004 | Werner ...................... 352/40 |

| | | | |
|---|---|---|---|
| 2004/0123316 A1 | 6/2004 | Kendall et al. .............. 725/37 |
| 2004/0218065 A1 | 11/2004 | Schinner .................. 348/231.6 |
| 2005/0084234 A1 | 4/2005 | Ejiri ........................ 386/46 |

FOREIGN PATENT DOCUMENTS

| | | |
|---|---|---|
| CN | 1444409 | 9/2003 |
| JP | 2001-119664 | 4/2001 |

OTHER PUBLICATIONS

European Search Report dated Feb. 15, 2008, 062513775-2202.
Korean Office Action dated Apr. 10, 2007, Sep. 5, 2007 019302075.
Chinese Office Action dated Nov. 7, 2008 with English translation, 200610058560.8.

\* cited by examiner

*Primary Examiner*—Reena Aurora
(74) *Attorney, Agent, or Firm*—KED & Associates LLP

(57) ABSTRACT

A display device for storing various sets of configuration data and a method for controlling the same are provided. The device includes an input unit and first and second controllers. Upon receiving a command to record specific image data through the input unit, the first controller determines a set of configuration data associated with the specific image data and stores the specific image data and the set of configuration data in association with each other. Upon receiving a command to reproduce stored specific image data, the second controller reads a set of configuration data associated with the specific image data and reproduces the specific image data according to the read set of configuration data. Thus, the stored specific image data can be reproduced in a display environment desired by the user without requiring the user to memorize and repeatedly input the desired set of video and audio configuration data.

31 Claims, 6 Drawing Sheets

FIG. 4A

| Recording Menu | | |
|---|---|---|
| [Q] | Whether to start recording? | Yes / No |
| [Q] | Whether to store set of configuration data? | Yes / No |
| [Q] | Select method for storing set of configuration data? | Manual / Auto |
| [Q] | File name for storage? | Father / Mother / Brother or sister / ⋮ / User input name |

FIG. 4B

| Playback Menu | | |
|---|---|---|
| [Q] | Whether to use stored set of configuration data? | Yes / No |
| [Q] | Select stored set of configuration data? | Auto / Father / Mother / ⋮ |
| [Q] | Whether to display image data using selected set of configuration data? | Yes / No |

DISPLAY DEVICE FOR STORING VARIOUS SETS OF CONFIGURATION DATA AND METHOD FOR CONTROLLING THE SAME

This application claims the benefit of the Korean Patent Application No. 10-2006-0014342, filed on Feb. 14, 2006, which is hereby incorporated by reference as if fully set forth herein.

BACKGROUND OF THE INVENTION

1. Field of the Invention

The present invention relates to a display device and a method for controlling the same, and more particularly, to a display device for storing various sets of configuration data and a method for controlling the same, wherein, after specific image data such as broadcast program data is stored, the specific image data can be reproduced and output in a display environment desired by a user at a later time.

2. Discussion of the Related Art

Display devices having a variety of new functions have been introduced along with the rapid development of display devices. Among the display devices, a Personal Video Recorder (PVR) has a function to store a large amount of image data and to reproduce the image data when required by the user at a later time.

The PVR, which is a device capable of recording digital broadcasts on a hard disk, has not only the basic recording function but also much improved functions over conventional VCRs, such as a time shift function, a live pause function, an instant replay function, and other various trick play functions.

One advantage of the PVR is to allow the user to record and reproduce digital broadcasts with the highest HD-level image quality on and from a hard disk at any time. This advantage and various other service functions of the PVR have a strong appeal to users.

Recently, the amount of programs that can be recorded by the PVR has greatly increased as the capacity of a hard disk provided for the PVR has greatly increased along with the rapid development of storage technologies.

Recent PVRs tend to be integrated with HD set-top boxes rather than be used separately. PVRs can freely record and reproduce digital broadcast programs in real time.

The conventional PVRs have a function to store a broadcast signal received over a broadcast channel selected by the user in an external or internal storage (for example, an HDD) of the PVR device and then to reproduce the stored broadcast signal when required by the user.

FIG. 1 is a block diagram of a conventional display device.

With reference to FIG. 1, a description will now be given of how a set of configuration data for video and audio output is managed in the conventional display device.

The conventional display device 101 includes a tuner 102, a demodulator 103, a decoder 104, an image processor 105, a display unit 106, a Hard Disk Drive (HDD) 107, and an EEPROM 108. The following description will be given using a PVR as an example of the display device 101.

The tuner 102 tunes in to a channel desired by the user to receive a broadcast signal (for example, in a transport stream format).

The demodulator 103 demodulates the broadcast signal received at the tuned channel frequency.

The decoder 104 decodes the demodulated broadcast signal so that it can be reproduced and stored at a later time.

The image processor 105 performs processing such as scaling of video data included in the decoded data so that the video data can be output through the display unit 106.

The display unit 106 displays the image processed by the image processor 105 on its screen.

The HDD 107 stores the video data, processed by the decoder 104, in a transport Stream (TS) format.

Depending on personal preferences, the user can specify various sets of video and audio configuration data which includes information regarding, for example, auto display adjustment, auto color temperature adjustment, contrast, brightness, saturation, sharpness, hue, aspect ratio, auto audio adjustment, and stereo sound. The specified set of video and audio configuration data is stored in the EEPROM 108.

However, the conventional display device (for example, a PVR) 101 has the following problems.

First, the conventional display device such as a PVR is designed such that, when image data (for example, broadcast program data or moving image data) is stored in the conventional display device, a transport stream of the image data is stored in the HDD while a set of video and audio configuration data associated with displaying the image data is separately stored in the EEPROM. Therefore, a set of video and audio configuration data must be repeatedly specified each time the image data stored in the HDD is read to be reproduced.

Second, the conventional display device such as a PVR may cause great inconvenience to users since it has no function to automatically detect a set of video and audio configuration data optimal for the characteristics of image data (for example, broadcast program data or moving image data) when storing the image data in the conventional display device and then to store the optimal set of video and audio configuration data together with the image data.

SUMMARY OF THE INVENTION

Accordingly, the present invention is directed to a display device for storing various sets of configuration data and a method for controlling the same that substantially obviate one or more problems due to limitations and disadvantages of the related art.

An object of the present invention is to provide a display device for storing various sets of configuration data and a method for controlling the same, wherein, when specific image data is recorded, a desired set of video and audio configuration data is stored together with a data stream containing the specific image data, so that the stored specific image data can be reproduced in a display environment desired by the user without requiring the user to memorize and repeatedly input the desired set of video and audio configuration data.

Another object of the present invention is to provide a display device for storing various sets of configuration data and a method for controlling the same, wherein, even when the user has not specified any set of video and audio configuration data associated with specific image data, an optimal set of video and audio configuration data is automatically detected and stored together with the specific image data, thereby providing a very convenient user interface (UI) to the user.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, a method for controlling a display device for storing various sets of configuration data when the display device performs recording includes: receiving a command to record specific image data; determining a set of configuration data associated with the specific image data; and storing the specific image data and the set of configuration data in association with each other.

In another aspect of the present invention, a method for controlling a display device for storing various sets of configuration data when the display device performs playback includes: receiving a command to reproduce specific image data stored in a storage; reading a set of configuration data associated with the specific image data and stored in the storage; and reproducing the specific image data according to the read set of configuration data.

In another aspect of the present invention, a method for controlling a display device for storing various sets of configuration data when the display device performs recording and playback includes: receiving a command to record specific image data; determining a set of configuration data associated with the specific image data; storing the specific image data and the set of configuration data in association with each other; receiving a command to reproduce specific image data stored in a storage; reading a set of configuration data associated with the specific image data and stored in the storage; and reproducing the specific image data according to the read set of configuration data.

In another aspect of the present invention, a display device for storing various sets of configuration data has a recording function and includes an input unit for receiving a command to record specific image data; a setting unit for determining a set of configuration data associated with the specific image data; and a controller for storing, in a storage, the specific image data and the set of configuration data in association with each other.

In another aspect of the present invention, a display device for storing various sets of configuration data has a playback function and includes an input unit for receiving a command to reproduce specific image data stored in a storage; a detection unit for reading a set of configuration data associated with the specific image data and stored in the storage; and a controller for reproducing the specific image data according to the read set of configuration data.

In another aspect of the present invention, a display device for storing various sets of configuration data has recording and playback functions and includes an input unit for receiving a command to record specific image data or a command to reproduce specific image data stored in a storage; a first controller that, upon receiving a command to record specific image data, determines a set of configuration data associated with the specific image data and stores, in the storage, the specific image data and the set of configuration data in association with each other, a second controller that, upon receiving a command to reproduce specific image data stored in the storage, reads a set of configuration data associated with the specific image data and reproduces the specific image data according to the read set of configuration data.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings:

FIG. 4A illustrates an embodiment of a recording menu screen of a display device according to the present invention;

FIG. 4B illustrates an embodiment of a playback menu screen of a display device according to the present invention;

DETAILED DESCRIPTION OF THE INVENTION

Reference will now be made in detail to the preferred embodiments of the present invention, examples of which are illustrated in the accompanying drawings. Wherever possible, the same reference numbers will be used throughout the drawings to refer to the same or like parts.

According to the present invention, there is no need for a user of a display device such as a PVR to repeatedly input a desired set of video and audio configuration data each time image data is recorded and reproduced in the display device, and, in addition, the specific image data can be output in an automatically optimized video and audio output environment, so that more convenient functions of the display device are provided to the user.

For a better understanding of the present invention, the following description is separated into a description of one example method for a display device (for example, a PVR) according to the present invention to store specific image data and a set of video and audio configuration data in association with each other (first embodiment), a description of another example method for a display device (for example, a PVR) according to the present invention to store specific image data and a set of video and audio configuration data in association with each other (second embodiment), a description of a menu screen provided by a display device (for example, a PVR) according to the present invention (third embodiment), a description of how a display device (for example, a PVR) according to the present invention operates to record specific image data (fourth embodiment), and a description of how a display device (for example, a PVR) according to the present invention operates to reproduce specific image data (fifth embodiment).

FIRST EMBODIMENT

Figure 1:
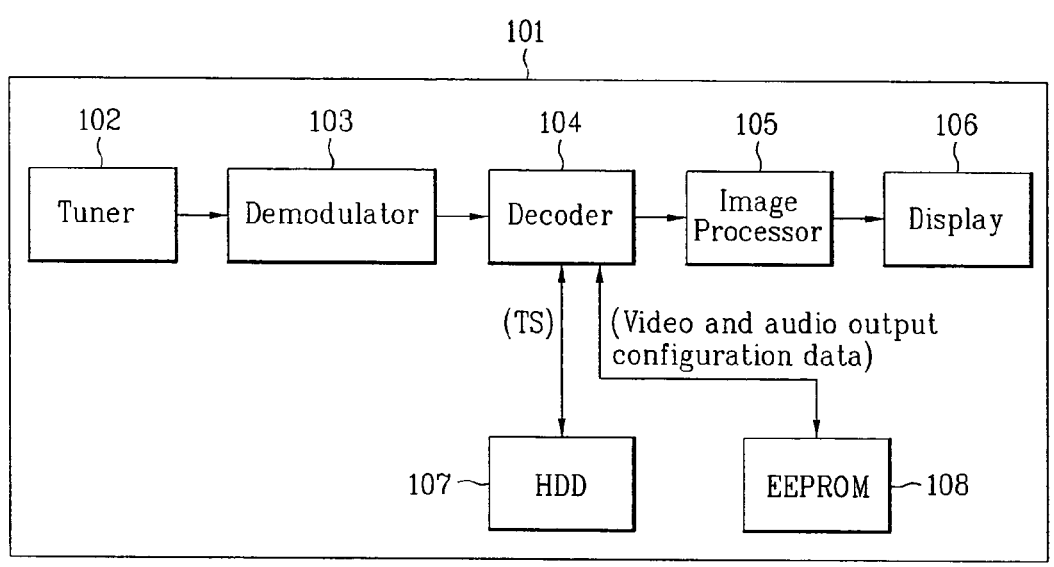
FIG. 1 is a block diagram of a conventional display device.
Figure 2A:
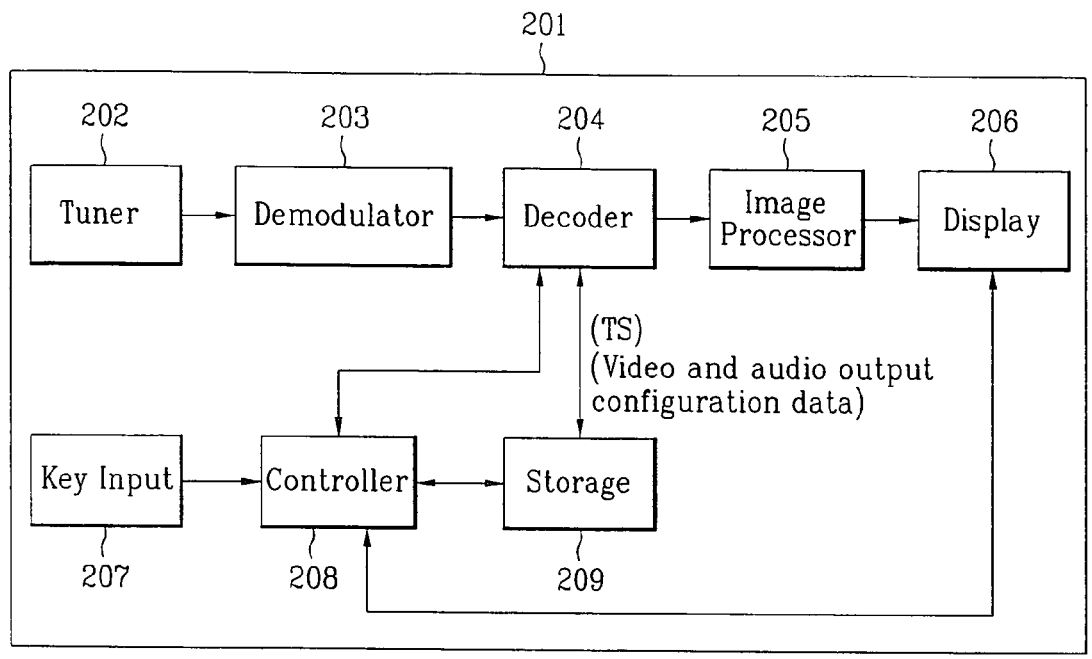
FIG. 2A is a block diagram of a first embodiment of a display device that stores various sets of configuration data according to the present invention.

FIG. 2A is a block diagram of a first embodiment of a display device that stores various sets of configuration data according to the present invention.

Figure 2B:
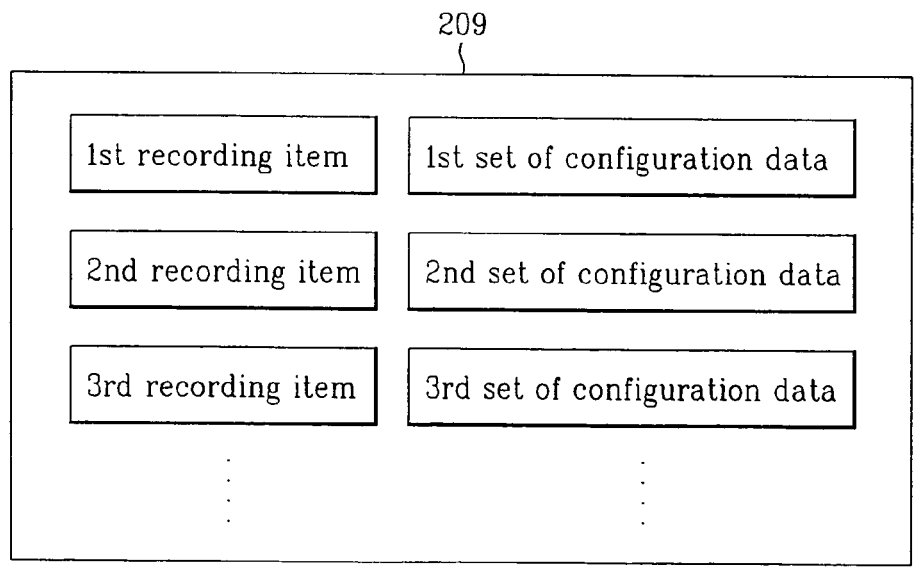
FIG. 2B illustrates an embodiment of a method for storing a set of configuration data in the display device shown in FIG. 2A according to the present invention.

FIG. 2B illustrates an embodiment of a method for storing a set of configuration data in the display device shown in FIG. 2A according to the present invention.

An example of the display device, which can store various sets of configuration data in association with image data, will now be described with reference to FIGS. 2A and 2B.

The display device 201 according to the present invention includes a tuner 202, a demodulator 203, a decoder 204, an image processor 205, a display unit 206, a key input unit 207, a controller 208, and a storage 209. Examples of the display device 201 include a PVR that can store various image data and can reproduce the stored data at a later time.

Examples of the image data include broadcast program data, moving image file data, and video data input from an external device.

The tuner 202, the demodulator 203, and the decoder 204 constitute a broadcast signal processor to receive a broadcast signal at a selected channel frequency and then to output a data stream including specific broadcast program data through demodulation and decoding processes.

Specifically, the tuner 202 receives a broadcast signal at the selected channel frequency, the demodulator 203 demodulates the received broadcast signal from the tuner 202, and the decoder 204 decodes the demodulated broadcast signal so that it can be reproduced.

The controller 208 stores the data stream including the specific broadcast program data output from the broadcast signal processor 202, 203, and 204 and a set of video and audio configuration data specified by the user in the storage 209 or allows the specific broadcast program to be reproduced at a later time according to the set of video and audio configuration data specified by the user.

The storage 209 includes, for example, a hard disc drive (HDD) and stores the set of video and audio configuration data together with the data stream including the specific broadcast program data.

The display unit 206 receives a data stream including specific broadcast program data, together with a corresponding set of video and audio configuration data, among the data stored in the storage 209, and sets a display environment according to the set of video and audio configuration data and then displays the data stream including the specific broadcast program data.

Preferably, the display device according to the present invention may further include a separate video processor 205 dedicated to processing video signals to be output through the display unit 206.

A more detailed description will now be given of an example of the display device which can store various sets of configuration data in association with image data according to the present invention.

The controller 202 stores a specific broadcast program received through the tuner 202 in the storage 209. The data that can be stored in the storage 209 is not limited to the broadcast program and includes various image data such as video file data received from other external devices.

The key input unit 207 receives a set of video and audio configuration data for an environment, in which the specific broadcast program stored in the storage 209 is to be reproduced at a later time, and transfers the received set of video and audio configuration data to the controller 208.

The set of video and audio configuration data is information regarding an environment in which specific image data (for example, specific broadcast program data) is to be output. The set of video and audio configuration data includes information regarding, for example, auto display adjustment, auto color temperature adjustment, contrast, brightness, saturation, sharpness, hue, aspect ratio, auto audio adjustment, and stereo sound.

An example of the key input unit 207 includes a remote controller or a local key provided on the display device 201.

The controller 208 stores the data stream including the specific broadcast program data, decoded by the decoder 204, in the storage 209 and also stores the corresponding set of video and audio configuration data in association with the data stream in the storage 209.

An example of the method for storing the data stream including the specific broadcast program data together with the corresponding set of video and audio configuration data is to store a file containing the data stream including the specific broadcast program data and a file containing the corresponding set of video and audio configuration data as shown in FIG. 2B.

However, there is a need to pair and store a specific recording item (i.e., the data stream including specific broadcast program data) and a corresponding set of configuration data in the storage 209 at a predetermined address thereof in order to make it possible to determine which set of configuration data matches the specific recording item.

Since a specific data stream and a corresponding set of video and audio configuration data are paired and stored in the storage 209 at a predetermined address thereof, the corresponding set of configuration data can be easily read when the user desires to reproduce the specific data stream at a later time.

Specifically, when the user desires to reproduce a stored specific broadcast program at a later time, the controller 208 sets a display environment according to a set of video and audio configuration data stored in the storage 209 corresponding to the specific broadcast program.

Through the key input unit 207, a single set of video and audio configuration data can be input in association with a data stream including data of a single specific broadcast program as described above. However, a plurality of sets of video and audio configuration data can also be input and stored in the storage 209 in association with a data stream including data of a single specific broadcast program.

For example, a first recording item is stored together with a first set of configuration data of a mother version and a second set of configuration data of a father version, and, when the user desires to reproduce the first recording item at a later time, a display screen for asking whether to select the mother version or the father version is displayed.

A detailed example of the display screen and a user interface (UI) will be described later in the third embodiment.

In another method, the controller 208 may automatically specify the set of video and audio configuration data instead of the user specifying it through the key input unit 207 as described above.

Digital broadcasts carry genre information, theme information, and the like thereof according to the PSIP specification. Thus, the controller 208 may previously determine information of a broadcast program to be recorded and then store, in the storage 209, a set of video and audio configuration data, optimized according to the determined information, together with the broadcast program to be recorded.

For example, when the user desires to record a broadcast program, the genre of which is movie, the controller 208 stores, in the storage 209, the broadcast program together with a set of video and audio configuration data that is specified such that the aspect ratio is 16:9 or an aspect ratio dedicated to cinema and the sound mode is stereo.

SECOND EMBODIMENT

Figure 3A:
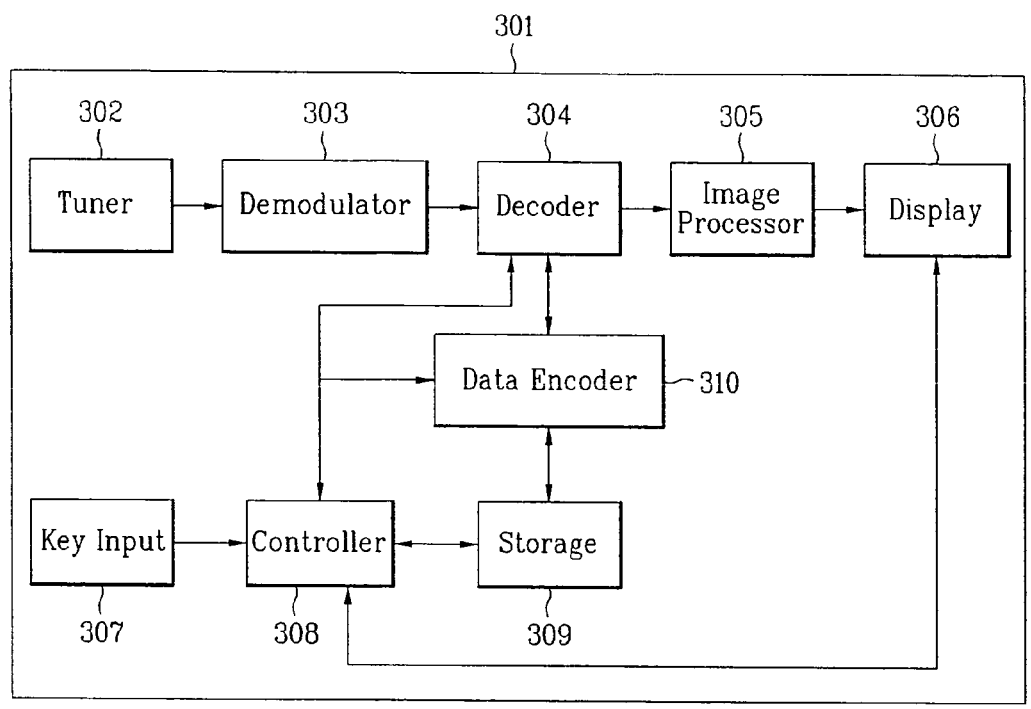
FIG. 3A is a block diagram of a second embodiment of a display device that stores various sets of configuration data according to the present invention.

FIG. 3A is a block diagram of a second embodiment of a display device that stores various sets of configuration data according to the present invention.

Figure 3B:
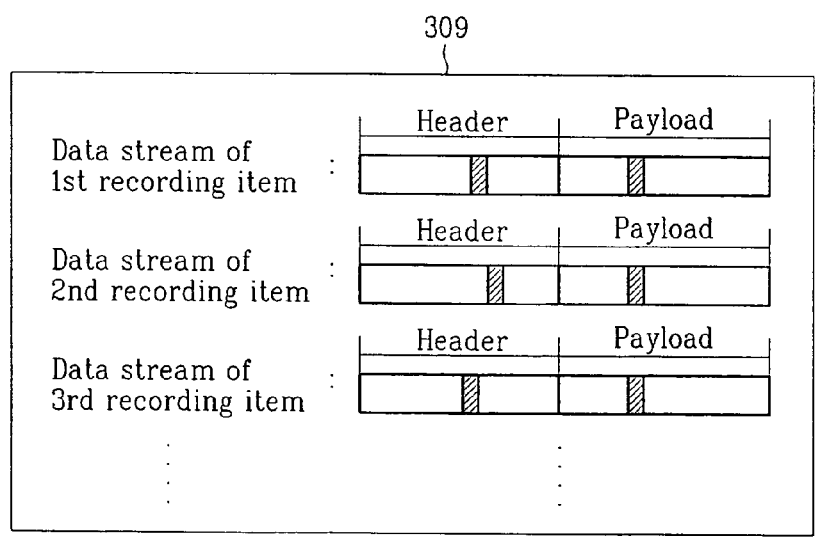
FIG. 3B illustrates an embodiment of a method for storing a set of configuration data in the display device shown in FIG. 3A according to the present invention.

FIG. 3B illustrates an embodiment of a method for storing a set of configuration data in the display device shown in FIG. 3A according to the present invention.

An example of the display device, which can store various sets of configuration data in association with image data, will now be described with reference to FIGS. 3A and 3B.

When compared to the display device 201 of the first embodiment shown in FIG. 2A, the display device 301 of the second embodiment shown in FIG. 3A further includes a data encoder 310. Thus, the second embodiment stores a set of video and audio configuration data in association with specific image data in a different method from the first embodiment. The following description of the second embodiment will focus on the different method from the first embodiment. A detailed description of components of the display device 301 other than the data encoder 310 will be omitted since their functions are easily understood from the description of the first embodiment.

The display device 301 according to the present invention includes a tuner 302, a demodulator 303, a decoder 304, an image processor 305, a display unit 306, a key input unit 307, a controller 308, a storage 309, and a data encoder 310.

The display device 301 is preferably a display device (for example, a PVR) that has a function to store image data of a broadcast program or the like.

A command to store specific image data is input through the key input unit 307. Examples of the image data include broadcast program data or moving image file data input from an external device. The following description of this embodiment will be given under the assumption that the image data is broadcast program data.

A set of video and audio configuration data that determines a display environment in which the specific image data to be stored will be output at a later time is also input through the key input unit 307.

Under the control of the controller 308, the data encoder 310 encodes both a data stream including specific broadcast program data received from the decoder 304 and a set of video and audio configuration data corresponding to the data stream into a single data stream, and stores the encoded data stream in the storage 309.

For example, when a data stream of a first recording item is present as shown in FIG. 3B, the data encoder 310 incorporates a corresponding set of video and audio configuration data into a reserved field (a shaded area in FIG. 3B) of the data stream of the first recording item and stores the data stream including the set of video and audio configuration data in the storage 309.

Using the reserved field without adding a separate field area maintains compatibility with the existing MPEG standards.

Accordingly, once a command to reproduce a specific recording item stored in the storage 309 is input through the key input unit 307, the controller 308 parses a reserved field, containing a set of video and audio configuration data, of a data stream of the specific recording item stored in the storage 309, and sets a display environment according to the set of video and audio configuration data contained in the reserved field.

THIRD EMBODIMENT

FIG. 4A illustrates an embodiment of a recording menu screen of a display device according to the present invention.

FIG. 4B illustrates an embodiment of a playback menu screen of a display device according to the present invention.

An example of a menu screen and a User Interface (UI) provided by a display device (for example, a PVR) according to the present invention will now be described with reference to FIGS. 4A and 4B. The following description of this embodiment is divided into a description of how to specify a set of configuration data for recording a specific broadcast program and a description of how to specify a set of configuration data for reproducing the recorded specific broadcast program.

First, a display screen for asking whether to start recording is output as shown in FIG. 4A.

If the user decides to start recording, a display screen for asking whether to store a set of video and audio configuration data is output. If the user decides not to store the set of video and audio configuration data, general recording is performed as in the conventional display device.

If the user decides to store the set of video and audio configuration data, a display screen for selecting a method for storing the set of configuration data is output.

If the user selects a method for automatically storing the set of configuration data, the controller determines an optimal set of video and audio configuration data using PSIP information of a received broadcast program.

If the user selects a method for manually storing the set of configuration data, the user inputs a command to adjust a video environment for display or an audio environment through the key input unit.

When the adjustment of the video environment for display or the audio environment is completed, a display screen for determining a file name for storage is output. This display screen is designed taking into consideration that a plurality of users may prefer different display environments even for a single image file.

In addition, as shown in FIG. 4B, a display screen for asking whether to use a stored set of configuration data in outputting a specific broadcast program is also output, contrary to the conventional display device.

If the user decides to use the stored set of configuration data in outputting the specific broadcast program, a display screen for asking which one of the stored sets of configuration data to use is output.

However, when only one set of configuration data has been stored for the specific broadcast program, the display screen for asking which one of the stored sets of configuration data to use may not be output.

When the user has decided to use a specific set of configuration data, a display screen for asking whether to output the specific broadcast program using the selected specific set of configuration data is finally output.

FOURTH EMBODIMENT

Figure 5:
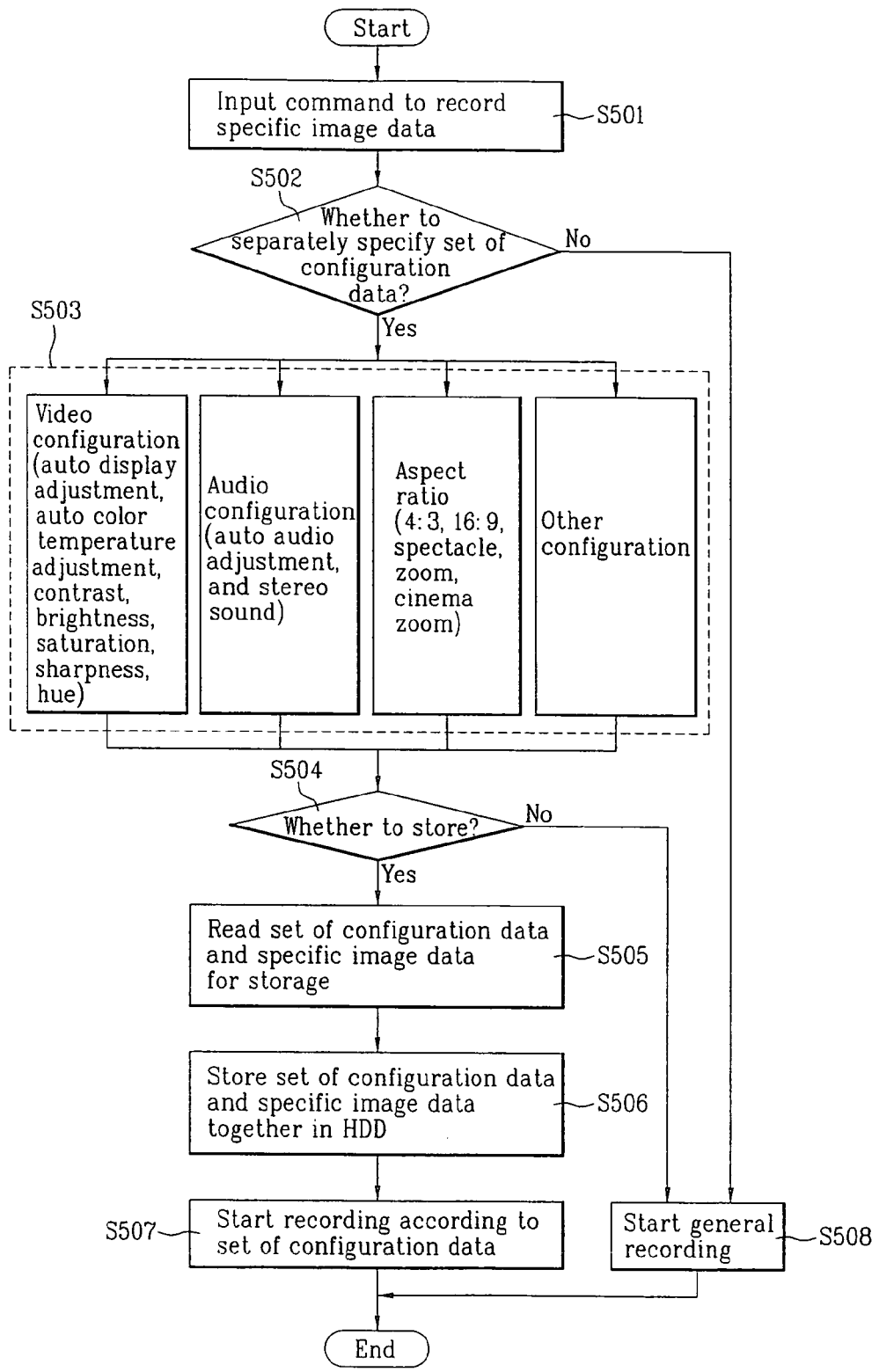
FIG. 5 is a flow chart illustrating a method for controlling a display device for storing various sets of configuration data when the display device performs recording according to the present invention.

FIG. 5 is a flow chart illustrating a method for controlling a display device for storing various sets of configuration data when the display device performs recording according to the present invention.

With reference to FIG. 5, a description will now be given of how the display device (for example, a PVR) according to the present invention records specific image data.

The following description of the fourth embodiment is given of how the display device according to the present invention operates, which can be easily understood from the above description of the first to third embodiments.

A command to record specific image data is input through the key input unit 207 or 307 of the display device 201 or 301 (S501). An example of the display device 201 or 301 includes a PVR, and examples of the image data include broadcast program data or moving image file data input from an external device.

After the recording command is input (S501), it is determined whether or not a command to separately specify a set of video and audio configuration data associated with a display environment has been input (S502).

If it is determined at step S502 that the command to separately specify the set of video and audio configuration data associated with the display environment has not been input, general recording is started (S508). The term "general recording" refers to a procedure for storing the specific image data alone without separately storing the set of video and audio configuration data.

If it is determined at step S502 that the command to separately specify the set of video and audio configuration data associated with the display environment has been input, a set of video and audio configuration data associated with the display environment, which includes information regarding, for example, auto display adjustment, auto color temperature adjustment, contrast, brightness, saturation, sharpness, hue, auto audio adjustment, stereo sound, and aspect ratio, is specified or adjusted (S503).

After the adjustment is completed (S503), it is determined whether or not the specified set of video and audio configuration data is to be stored (S504).

If it is determined at step S504 that the specified set of video and audio configuration data is not to be stored, general recording is started (S508).

If it is determined at step S504 that the specified set of video and audio configuration data is to be stored, the specific image data and the set of configuration data for storage is read (S505).

The controller 208 or 308 then stores the set of configuration data and the specific image data together in the storage 209 or 309 (S506). Specifically, a file containing the specific image data and a file containing the corresponding set of configuration data may be paired and stored in the storage 209 or 309 at a predetermined address as shown in FIG. 2B. Alternatively, the specific image data and the corresponding set of configuration data may be stored together in a single data stream format in the storage 209 or 309 as shown in FIG. 3B.

Then, recording of the specific image file is started according to the specified set of video and audio configuration data, so that the specific image file according to the specified set of video and audio configuration data is stored in the storage 209 or 309 (S507).

FIFTH EMBODIMENT

Figure 6:
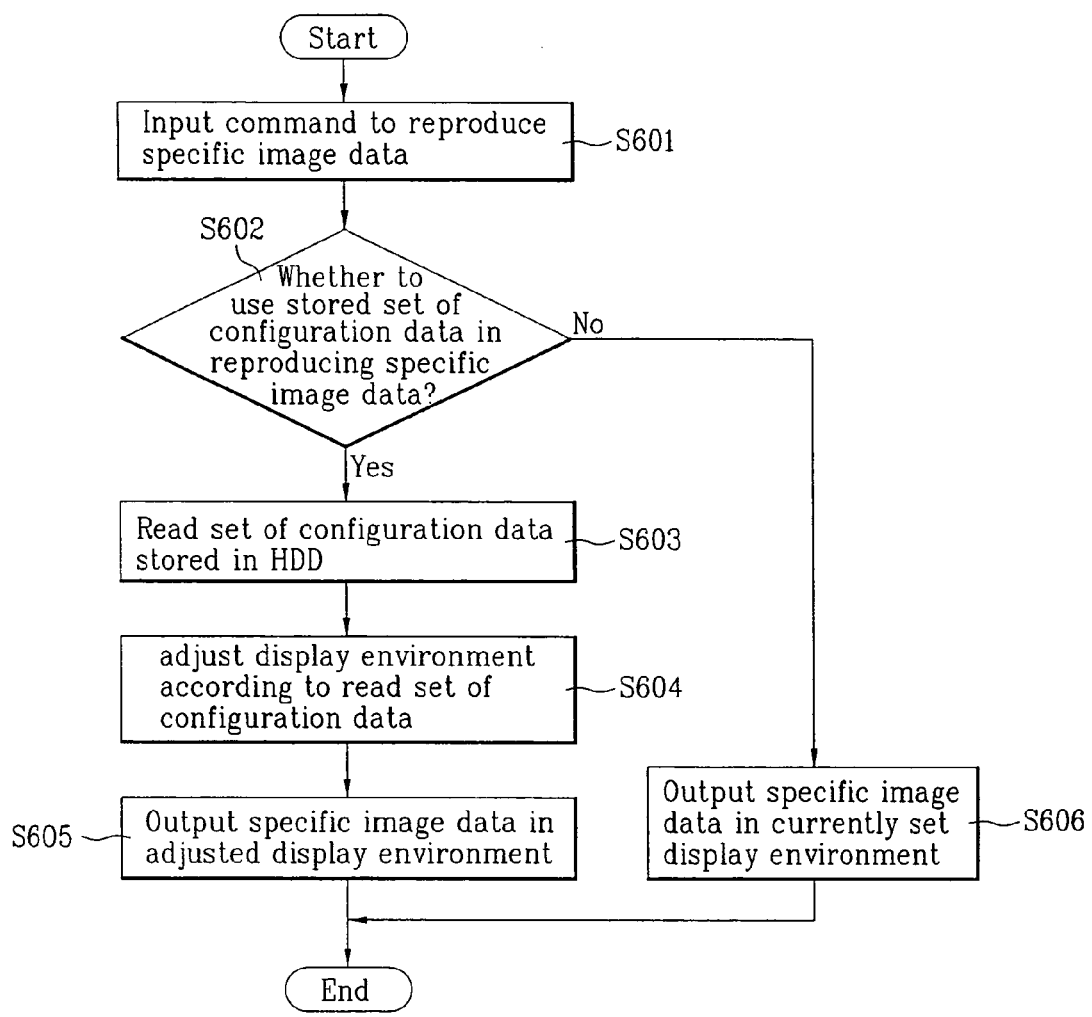
FIG. 6 is a flow chart illustrating a method for controlling a display device for storing various sets of configuration data when the display device performs playback according to the present invention.

FIG. 6 is a flow chart illustrating a method for controlling a display device for storing various sets of configuration data when the display device performs playback according to the present invention.

With reference to FIG. 6, a description will now be given of how the display device (for example, a PVR) according to the present invention reproduces specific image data.

The following description of the fifth embodiment is given of how the display device according to the present invention operates, which can be easily understood from the above description of the first to third embodiments.

First, a command to reproduce specific image data stored in the storage 209 or 309 is input through the key input unit 207 or 307 of the display device 201 or 301 (S601). An example of the key input unit 207 includes a remote controller of the display device 201 or 301 or a local key provided on the display device 201 or 301.

It is determined whether or not a command to reproduce the specific image data according to the stored set of video and audio configuration data has been input (S602).

If it is determined at step S602 that the command to reproduce the specific image data according to the stored set of video and audio configuration data has not been input, the specific image data is reproduced according to a currently set display environment (S606).

If it is determined at step S602 that the command to reproduce the specific image data according to the stored set of video and audio configuration data has been input, the controller 208 or 308 reads the set of configuration data stored in the storage 209 or 309 corresponding to the specific image data (S603). An example of the storage 209 includes a hard disc drive (HDD).

The controller 209 or 309 adjusts the display environment of the display device 201 or 301 according to the read set of configuration data (S604).

The specific image data, which has been requested to be reproduced by the command, is then output according to the adjusted display environment (S605).

As is apparent from the above description, the present invention provides a display device for storing various sets of configuration data and a method for controlling the same, wherein, when specific image data is recorded, a desired set of video and audio configuration data is stored together with a data stream containing the specific image data, so that the stored specific image data can be reproduced in a display environment desired by the user without requiring the user to memorize and repeatedly input the desired set of video and audio configuration data.

The present invention also provides a display device for storing various sets of configuration data and a method for controlling the same, wherein, even when the user has not specified any set of video and audio configuration data associated with specific image data, an optimal set of video and audio configuration data is automatically detected and stored together with the specific image data, thereby providing a very convenient user interface (UI) to the user.

It will be apparent to those skilled in the art that various modifications and variations can be made in the present invention without departing from the spirit or scope of the inventions. Thus, it is intended that the present invention covers the modifications and variations of this invention provided they come within the scope of the appended claims and their equivalents.

What is claimed is:

1. A method for controlling a display device for storing various sets of configuration data when the display device performs recording, the method comprising:
   receiving a command to record image data;
   determining at least one set of configuration data associated with the image data based on information received from a key input unit, the at least one set of configuration data input using a recording menu screen; and
   storing the image data and the set of configuration data after incorporating the set of configuration data into a data stream including the image data, wherein the set of configuration data determines a display environment of the stored image data.

2. The method according to claim 1, wherein storing the image data and the set of configuration data includes: pairing and storing the specific image data and the set of configuration data at a predetermined address.

3. The method according to claim 1, wherein incorporating the set of configuration data into the data stream including the image data includes: incorporating the set of configuration data into a reserved field of the data stream including the image data.

4. The method according to claim 1, wherein determining the set of configuration data associated with the image data includes: either
   determining the set of configuration data associated with the image data according to a set of video and audio configuration data specified by a user; or
   determining the set of configuration data associated with the image data according to a predetermined set of video and audio configuration data.

5. The method according to claim 4, wherein the predetermined set of video and audio configuration data includes a set of video and audio configuration data previously stored taking into account genre and theme of image data.

6. The method according to claim 1, wherein the image data includes at least one of broadcast program data and data or audio/video (A/V) information received from an external device.

7. The method according to claim 1, wherein the set of configuration data associated with the image data includes configuration data regarding at least one of auto display adjustment, auto color temperature adjustment, contrast, brightness, saturation, sharpness, hue, aspect ratio, auto audio adjustment, or stereo sound.

8. The method according to claim 1, wherein the display device includes a storage area that can store the image data.

9. The method according to claim 8, wherein the display device is a Personal Video Recorder (PVR).

10. The method according to claim 1, wherein said storing includes: storing the image data and set of configuration data as associated files in a storage area.

11. The method according to claim 1, wherein said determining includes:
    determining first and second sets of configuration data associated with the received image data, wherein the first set of configuration data is different from the second set of configuration data and wherein said storing includes:
    storing the first and second sets of configuration data and the second set of configuration data in an area of a storage device that corresponds to the image data.

12. The method according to claim 11, wherein the first set of configuration data corresponds to one or more preferences of a first user and the second set of configuration data corresponds to one or more preferences of a second user.

13. The method according to claim 12, further comprising:
    displaying a menu containing options corresponding to the first and second sets of configuration data; and
    outputting the image data to the display device based on a selection of one of the options.

14. The method according to claim 13, wherein the options in the menu are displayed with identifiers that identify respective ones of the first and second users.

15. The method according to claim 1, wherein said determining includes:
    automatically specifying the set of configuration data associated with the image data based on descriptive information received from a transmission source.

16. The method according to claim 15, wherein the descriptive information includes PSIP information.

17. The method according to claim 16, wherein the PSIP information provides an indication of at least one of a theme or genre corresponding to the image data.

18. The method according to claim 1, further comprising:
    outputting the stored image data to the display device based on the set of configuration data incorporated into the data stream including the image data.

19. A method for controlling a display device for storing various sets of configuration data when the display device performs playback, the method comprising:
    receiving a command to reproduce image data stored in a storage area, the command generated using a playback menu screen that includes a prompt requesting whether a stored set of configuration data should be used in reproducing the image data;
    reading the set of configuration data associated with the image data and stored in the storage area; and
    reproducing the image data according to the read set of configuration data,
    wherein the set of configuration data associated with the image data is incorporated into a data stream including the image data.

20. A method for controlling a display device for storing various sets of configuration data when the display device performs recording and playback, the method comprising:
    receiving a command to record image data;
    determining a set of configuration data associated with the image data based on information received from a key input unit, the at least one set of configuration data input using a recording menu screen;
    pairing the image data and the corresponding set of configuration data;
    storing the paired image data and the set of configuration data at a predetermined address in a storage area;
    receiving a command to reproduce the image data stored in the storage area using a playback menu screen that includes a prompt requesting whether a stored set of configuration data should be used in reproducing the image data;
    reading a set of configuration data associated with the image data and stored at said or another predetermined address in the storage area; and
    reproducing the image data according to the read set of configuration data, wherein the set of configuration data determines a display environment of the image data.

21. A display device for storing various sets of configuration data, the display device having a recording function, the display device comprising:
    an input unit for receiving a command to record image data;
    a setting unit for determining a set of configuration data associated with the image data based on information received from the input unit, the set of configuration data input using a recording menu screen; and a controller for storing, in a storage area, the image data and the set of configuration data after incorporating the set of configuration data into a data stream including the image data, wherein the set of configuration data determines a display environment of the stored image data.

22. The display device according to claim 21, wherein the controller performs: pairing and storing the image data and the set of configuration data in the storage area at a predetermined address thereof.

23. The display device according to claim 21, wherein incorporating the set of configuration data into the data stream including the image data includes: incorporating the set of configuration data into a reserved field of the data stream including the image data.

24. The display device according to claim 21, wherein the setting unit performs: either determining the set of configuration data associated with the image data according to a set of video and audio configuration data specified by a user; or determining the set of configuration data associated with the image data according to a predetermined set of video and audio configuration data.

25. The display device according to claim 24, wherein the predetermined set of video and audio configuration data includes a set of video and audio configuration data previously stored taking into account genre and theme of image data.

26. The display device according to claim 21, wherein the image data includes at least one of data of a broadcast program received through a tuner and data or audio/video (A/V) information received from an external device.

27. The display device according to claim 21, wherein the set of configuration data associated with the image data includes configuration data regarding at least one of auto display adjustment, auto color temperature adjustment, contrast, brightness, saturation, sharpness, hue, aspect ratio, auto audio adjustment, and stereo sound.

28. The display device according to claim 21, wherein the display device includes a storage area that can store the image data.

29. The display device according to claim 28, wherein the display device is a Personal Video Recorder (PVR).

30. A display device for storing various sets of configuration data, the display device having a playback function, the display device comprising:

an input unit for receiving a command to reproduce image data stored in a storage area using a playback menu screen that includes a prompt requesting whether a stored set of configuration data should be used in reproducing the image data;

a detection unit for reading a set of configuration data associated with the image data and stored in the storage area; and a controller for reproducing the image data according to the read set of configuration data, wherein the set of configuration data associated with the image data is incorporated into a data stream including the image data and wherein the set of configuration data determines a display environment of the stored image data.

31. A display device for storing various sets of configuration data, the display device having recording and playback functions, the display device comprising:

an input unit for receiving a command to record image data or a command to reproduce image data stored in a storage area;

a first controller that, upon receiving a command to record image data, determines a set of configuration data associated with the image data based on information received from the input unit, the set of configuration data input using a recording menu screen, pairs the image data and the corresponding set of configuration data, and stores, in the storage area, the image data and the set of configuration data at a predetermined address, and a second controller that, upon receiving a command to reproduce image data stored at a predetermined address in the storage area using a playback menu screen that includes a prompt requesting whether a stored set of configuration data should be used in reproducing the image data, reads the set of configuration data associated with the image data and reproduces the image data according to the read set of configuration data, wherein the set of configuration data determines a display environment of the stored image data.

* * * * *